(12) United States Patent
Nozawa (10) Patent No.: US 12,398,666 B2
(45) Date of Patent: Aug. 26, 2025

(54) VEHICLE

(71) Applicant: TOYOTA JIDOSHA KABUSHIKI KAISHA, Toyota (JP)

(72) Inventor: Takashi Nozawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/892,656

(22) Filed: Sep. 23, 2024

(65) Prior Publication Data

US 2025/0122818 A1 Apr. 17, 2025

(30) Foreign Application Priority Data

Oct. 12, 2023 (JP) .................................. 2023-176808

(51) Int. Cl.
*F01N 3/20* (2006.01)
*B60L 1/02* (2006.01)
*F01N 9/00* (2006.01)
*B60L 50/10* (2019.01)

(52) U.S. Cl.
CPC .............. *F01N 3/2026* (2013.01); *B60L 1/02* (2013.01); *F01N 9/00* (2013.01); *B60L 50/10* (2019.02); *B60L 2210/30* (2013.01); *B60L 2210/40* (2013.01); *F01N 2240/16* (2013.01); *F01N 2390/02* (2013.01); *F01N 2900/0602* (2013.01)

(58) Field of Classification Search
CPC ...... F01N 3/2026; F01N 9/00; F01N 2240/16; F01N 2390/02; F01N 2900/0602; B60L 1/02; B60L 50/10; B60L 2210/30; B60L 2210/40

USPC .................... 60/286, 300, 303; 180/65.21
See application file for complete search history.

(56) References Cited

U.S. PATENT DOCUMENTS

| | | | | |
|---|---|---|---|---|
| 5,758,498 A | * | 6/1998 | Fukui .................... | F01N 3/2814 422/174 |
| 7,829,048 B1 | * | 11/2010 | Gonze ................. | B01D 53/9454 423/213.2 |
| 2010/0212294 A1 | * | 8/2010 | Narayanaswamy ......................... | F01N 13/0093 60/303 |
| 2015/0218995 A1 | * | 8/2015 | Hashimoto ........... | F01N 3/2013 60/286 |
| 2017/0306821 A1 | | 10/2017 | Hashimoto et al. | |
| 2022/0065147 A1 | * | 3/2022 | Sugaya ............... | F01N 13/1805 |

FOREIGN PATENT DOCUMENTS

JP 2017-193245 A 10/2017

* cited by examiner

*Primary Examiner* — Jorge L Leon, Jr.
(74) *Attorney, Agent, or Firm* — Dinsmore & Shohl LLP (57) ABSTRACT

A vehicle includes: an internal combustion engine; a rotating electric machine; a power storage device; first and second electric heating type catalyst for purifying exhaust gas; a bidirectional power converter which converts first AC power into DC power, and convert DC power into a second AC power; a plurality of relays, which are electrically connected to a first power path and a second power path and which at least selects one of and switch between parallel connection and series connection of the first electric heating type catalyst and the second electric heating type catalyst; and a controller configured to control ON and OFF of each of the relays.

4 Claims, 7 Drawing Sheets

VEHICLE

CROSS-REFERENCE TO RELATED APPLICATION(S)

The present application claims priority to and incorporates by reference the entire contents of Japanese Patent Application No. 2023-176808 filed in Japan on Oct. 12, 2023.

BACKGROUND

The present disclosure relates to a vehicle.

Japanese Laid-open Patent Publication No. 2017-193245 discloses the electric heating type catalyst for purifying the exhaust gas discharged from the internal combustion engine and a vehicle that receives power from the power storage device.

SUMMARY

There is a need for providing a vehicle capable of supplying power from the bidirectional power converter to the electric heating type catalyst of the two systems.

According to an embodiment, a vehicle includes: an internal combustion engine; a rotating electric machine, which is a driving source for running the vehicle; a power storage device for storing power to be supplied to the rotating electric machine; a first electric heating type catalyst and a second electric heating type catalyst, each of which has a catalyst for purifying exhaust gas discharged from the internal combustion engine and is supplied power from the power storage device to electrically heat the catalyst; and a bidirectional power converter having a DC port for electrically connecting to the power storage device, a first AC port to which a first AC power for charging the power storage device is input, and a second AC port for outputting a second AC power. Further, the bidirectional power converter that converts the first AC power into DC power to output the DC power to the DC port, and converts DC power supplied from the power storage device into the second AC power to output the second AC power to the second AC port, and the vehicle further includes: a plurality of relays, which are electrically connected, via a plurality of power lines, to a first power path, which connects the bidirectional power converter and the first AC port, and a second power path connecting the bidirectional power converter and the second AC port, that at least selects one of and switches between parallel connection and series connection of the first electric heating type catalyst and the second electric heating type catalyst; and a controller that controls ON and OFF of each of the relays.

DETAILED DESCRIPTION

In a vehicle in which external charging to a power storage device and external power supply from a power storage device can be performed through a bidirectional power conversion device, there is room for investigation in technology for enabling power supply from the bidirectional power conversion device to two systems of electrically heated catalysts.

Hereinafter, an embodiment of a vehicle according to the present disclosure. Note that the present disclosure is not limited by the present embodiment.

The vehicle 100 according to the embodiment includes a bidirectional power converter 1, a first Electrically Heated Catalyst (EHC) 21, a second EHC 22, and an Electronic Control unit (ECU) 30, an inlet, an outlet, and a battery. The bidirectional power converter 1 includes a DC port for electrically connecting the bidirectional power converter 1 with a battery, a first AC port, a second AC port for outputting AC power, and a communication port 16 to which a communication line can be connected. The ECU 30 is, for example, a controller configured to control the bidirectional power converter 1.

When the vehicle performs external charging, AC power for charging the battery is inputted into 1AC port. When the vehicle is powered by an electrical outlet, 2AC outlet provides AC power. When the car is powered externally, 1AC outputting AC power.

The DC port is a connector for connecting a wire connected to the battery to the bi-directional power converter 1. The first AC port is a connector for connecting a wire connected to an inlet to which the charge plug can be connected to the bidirectional power converter 1. The second AC port is a connector for connecting a wire connected to an outlet for outputting AC power to the bidirectional power converter 1. The bidirectional power converter 1 is detachably configured at each connector. Thus, replacement of the bidirectional power converter 1 is facilitated.

The bidirectional power converter 1 is configured to convert the first AC power inputted to the first 1AC port during external charge to DC power and outputs it to DC port. Further, the bidirectional power converter 1, at the time of outlet feeding, and is configured to convert the DC power supplied from the battery to DC port to the second AC power and outputs it to 2AC port. Further, the bidirectional power converter 1, at the time of external power supply, and is configured to convert the DC power supplied from the battery to DC port to a third AC power and outputs it to the first AC port.

Figure 1:
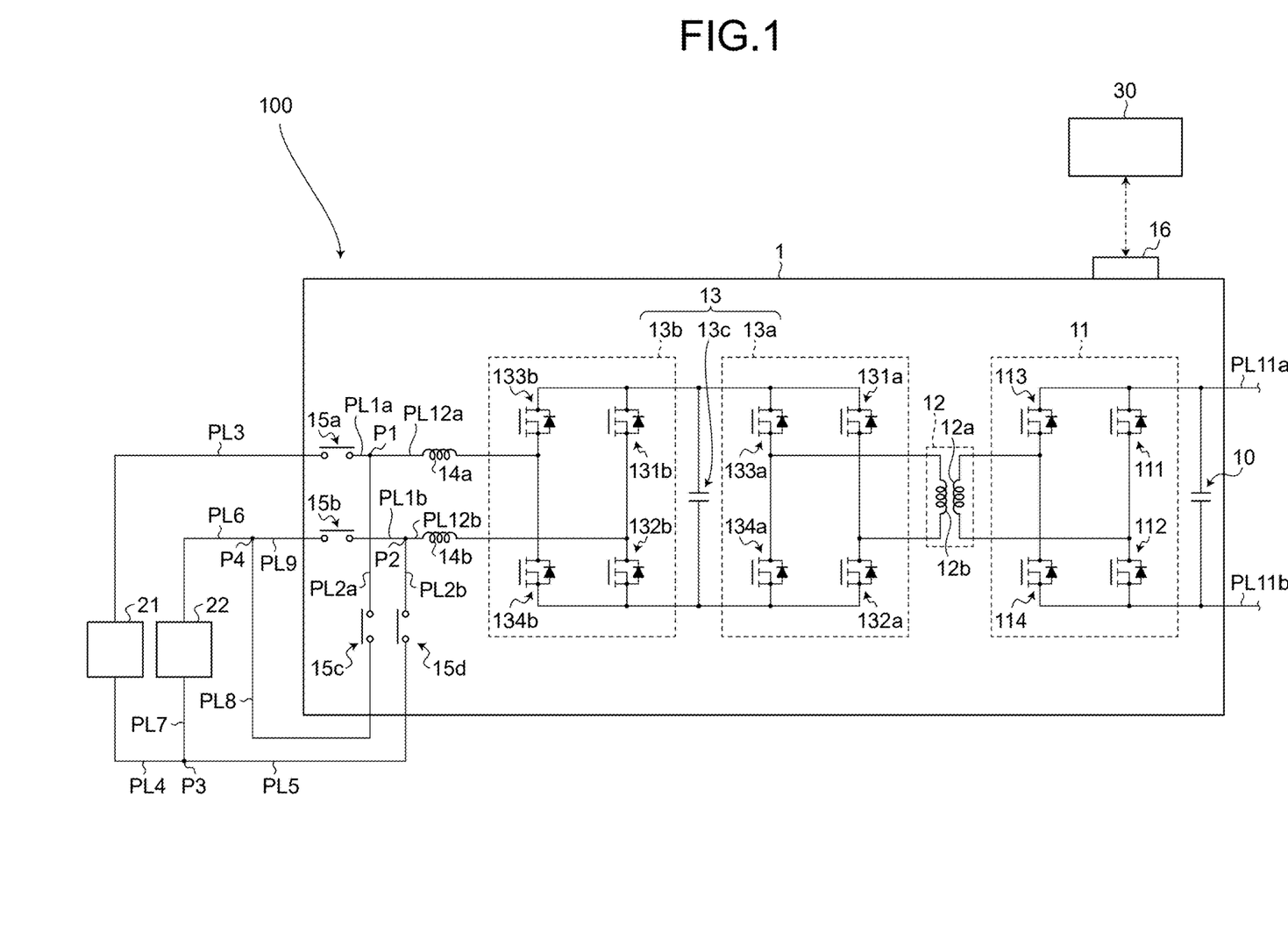
FIG. 1 is a diagram illustrating an example of a circuit configuration of a bidirectional power converter according to the embodiment.

FIG. 1 is a diagram illustrating an example of a circuit configuration of a bidirectional power converter 1 according to the embodiment. As illustrated in FIG. 1, the bidirectional power converter 1 according to the embodiment includes a capacitor 10, an inverter 11, an insulating circuit 12, an inverter 13, two reactor 14a, 14b, and a relay 15a, 15b, 15c, 15d and the like. The inverter 11 is a full bridge circuit including four switching elements of the first switching element 111 and the second switching element 112 and the third switching element 113 and the fourth switching element 114. The insulating circuit 12 is an insulating transformer including a first coil 12a and the second coil 12b. The insulating circuit 12 performs transformation at a ratio corresponding to the turn ratio of the first coil 12a and the second coil 12b. The inverter 13 includes a first inverter 13a, a second inverter 13b, and a smoothing capacitor 13c. The first inverter 13a is a full bridge circuit including four switching elements of the first switching element 131a and the second switching element 132a and the third switching element 133a and the fourth switching element 134a. The second inverter 13b is a full bridge circuit including four switching elements of the first switching element 131b and the second switching element 132b and the third switching element 133b and the fourth switching element 134b. The switching elements included in the inverter 11 and the inverter 13, ON and OFF is controlled by ECU 30.

In each of the power feeding and charging, the ECU 30 controls the bi-directional power conversion device 1 so that the bi-directional power conversion device 1 performs power conversion to be described below. Although not illustrated in FIG. 1, in order to acquire the information used by the ECU 30 in the control, various sensors (e.g., a current sensor and a voltage sensor, etc.) are provided in an appropriate position of the circuit illustrated in FIG. 1.

At the time of power feeding, the inverter 11 is outputted to the insulating circuit 12 converts the DC power inputted from the first end (DC port-side) to a high-frequency AC power. The isolation circuitry 12 transfers the output of the inverter 11 (AC power) to the first inverter 13a. The first inverter 13a rectifies the AC power received from the insulating circuit 12 and outputs it to the second inverter 13b. At this time, the smoothing capacitor 13c is charged by the output power from the first inverter 13a, the output voltage of the first inverter 13a and substantially the same voltage. The second inverter 13b converts the DC power received from the first inverter 13a into a predetermined AC power to be outputted to the second end (reactor 14a, 14b).

In charging, the second inverter 13b is outputted to the first inverter 13a rectifies the AC power inputted from the second end (reactor 14a, 14b). The first inverter 13a converts the DC power received from the second inverter 13b to AC power of high frequency. The isolation circuitry 12 transmits the output of the first inverter 13a (AC power) to the inverter 11. The inverter 11 rectifies the AC power received from the insulating circuit 12 and outputs the first end (DC portside).

The inlet is electrically connected to the first AC port of the bi-directional power converter 1 through a wire. A connector is provided at the end of the wire leading to the inlet, and the connector of the inlet is connected to the first AC port. The inlet is installed so that the user can use it from outside the vehicle. The inlet may be provided, for example, on the rear side of the body. The inlet is covered by a charging lid when not in use. The inlet is exposed when the user opens the charging lid. Then, by the user connecting the plug of the Electric Vehicle Supply Equipment (EVSE) to the inlet, the power can be supplied to the vehicles using EVSE. The plug of EVSE is, for example, a connector of a charging cable, and when the plug is connected to the inlet, EVSE and the vehicle are electrically connected via the charging cable. When powered externally, the user can power EVSE from the inlet of the vehicle.

The outlet is electrically connected to the second AC port of the bi-directional power converter 1 through a wire. A connector is provided at the end of the wire leading to the outlet, and the connector of the outlet is connected to the second AC port. The outlet is a vehicle interior outlet installed in the vehicle cabin. The outlet outputs the second AC power.

The second AC power is, for example, 100V AC power.

The battery is electrically connected to DC of the bi-directional power converter 1 through a wire. The battery is a power storage device that stores electric power supplied to the rotating electric machine to be described later. The battery is, for example, a secondary battery such as a lithium ion battery or a nickel metal hydride battery. In the present embodiment, as the secondary battery, and employs a battery pack including a plurality of lithium ion batteries. The assembled battery is configured by a plurality of battery cells are electrically connected to each other.

The ECU 30 is connected to a communication port 16 of the bidirectional power converter 1 via a signaling line. The ECU 30 is composed of a processor, a Random Access Memory (RAM), and a storage device. For example, a Central Processing Unit (CPU) can be employed as a processor. RAM functions as a working memory for temporarily storing data are to be processed by the processor. The storage device is configured to store stored information. As a storage device, for example, a Read Only Memory (ROM) and a rewritable non-volatile memory can be employed. In addition to the program, information used in the program (e.g., maps, mathematical expressions, and various parameters) is stored in the memory. In an embodiment, various controls in the ECU 30 are executed by executing a program stored in the storage device by the processor.

The vehicles further include a Power Control Unit (PCU), a rotating electric machine, a power transmission gear, drive wheels, a System Main Relay (SMR), and a starter. The vehicle can run by supplying the electric power stored in the battery to the rotating electric machine which is a driving source for the vehicle running.

The SMR is provided in the power path connecting the battery and the PCU. The connecting or disconnecting state of SMR is controlled by the ECU 30. When the SMR is connected, power can be exchanged between the battery and PCU. On the other hand, when the SMR is shut off, it becomes impossible to transfer electric power between the battery and the PCU. The SMR is connected, for example, when the vehicle is running.

The rotating electric machine is, for example, a three-phase AC motor generator. The rotating electric machine is driven by the PCU and is configured to rotate the driving wheels of the vehicles. The PCU includes, for example, inverters and converters. The PCU inverters and converters are controlled by the ECU 30. The output torque of the rotating electricity is transmitted to the drive wheels through a power transmission gear that serves as a reduction gear or differential. The rotating electric machine is also configured to perform regenerative power generation and supply the generated power to the battery.

The activation switch is a switch for starting the vehicle system. The activation switch is operated when the system is stopped, thereby activating the vehicular system including the ECU 30. On the other hand, the vehicle system is stopped by the activation switch is operated when the system is activated. The start-up switch is commonly referred to as a power switch or ignition switch.

In this embodiment, the power path connecting the bi-directional power converter 1 and the first AC port is referred to as a first power path. A power line PL1a constitutes a part of the first power path of the first polarity, and power line PL1b constitutes a part of the first power path of the second polarity. Further, in the present embodiment, the power path connecting the bidirectional power converter 1 and the second AC port is referred to as a second power path. A power line PL2a constitutes a part of the second power path of the first polarity, and the power line PL2b constitutes a part of the second power path of the second polarity. The first power path and the second power path are selectively switchable by a switching device having a plurality of relays.

The first end of the bidirectional power converter 1, the power line PL11a of the first polarity and the power line PL11b of the second polarity are connected. The second end of the bidirectional power converter 1, the power line PL12a of the first polarity and the power line PL12b of the second polarity are connected. In charging, power is input to the second end side, power is output from the first end side. At the time of power feeding, the power is input to the first end side, power is output from the second end side. The first polarity and the second polarity are opposite polarities.

Each of the power lines PL11a, PL11b is connected to a DC porting. The power line PL12a is branched into a power line PL1a and a power line PL2a at the first branch point P1. To the power line PL1a, the first relay 15a is connected. To the power line PL2a, the third relay 15c is connected. The power line PL12b is branched into a power line PL1b and a power line PL2b at the second branch point P2. To the power line PL1b, the second relay 15b is connected. To the power line PL2b, the fourth relay 15d is connected.

The first EHC 21 is connected to the first relay 15a by a power line PL3 and is connected to the fourth relay 15d by a power line PL4 and a power line PL5. The power line PL4 is branched into a power line PL5 and a power line PL7 at the third branch point P3. The second EHC 22 is connected to the second relay 15b by a power line PL6 and is connected to the fourth relay 15d by a power line PL7 and a power line PL5. The third relay 15c is connected to the power line PL6 at the fourth branch point P4 by a power line PL8.

The first EHC 21 and the second EHC 22 are electrically heated catalysts provided in the exhaust passage of the engine, which is an internal combustion engine provided in the vehicle. The first EHC 21 and the second EHC 22 has a catalyst converter for purifying the exhaust gases emitted from the engine. The first EHC 21 and the second EHC 22, for example, are configured to electrically heat the catalyst converter by being supplied with power from a battery through the bidirectional power converter 1.

In the vehicle according to the embodiment, the bi-directional power converter 1 has a function as a power supply device of the first EHC 21 and the second EHC 22. When the bi-directional power converter 1 functions as a power supply device of the first EHC 21 and the second EHC 22, for example, a smoothing capacitor 13c of the inverter 13 as a power source, a battery (the first inverter 13a of the inverter 13) It supplies power to at least one of the first EHC 21 and the second EHC 22 from the smoothing capacitor 13c charged by the output power. In the vehicle according to the embodiment, for example, the power output from the first inverter 13a of the inverter 13, the output power of the power source when the bi-directional power converter 1 may function as a power supply of the first EHC 21 and the second EHC 22. Further, in the vehicle according to some embodiments, as a configuration in which the bidirectional power converter 1 functions as a power supply device of the first EHC 21 and the second EHC 22, the second inverter 13b of the inverter 13 is not required.

In the vehicle according to the embodiment, to a first power path connecting the bidirectional power converter 1 and the first AC port, and a second power path connecting the bidirectional power converter 1 and second AC port via a plurality of power lines, the first EHC 21 and the second EHC 22 are electrically connected. Furthermore, in the vehicle according to the embodiment, the parallel connection and the series connection of the first EHC 21 and the second EHC 22 as a plurality of relays which can be at least selectively switched, the first relay 15a and the second relay 15b and four relays of the third relay 15c and the fourth relay 15d are electrically connected to such a plurality of power lines.

In the vehicle according to the embodiment, the control of ON and OFF of each of the first relay 15a and the second relay 15b and the third relay 15c and the fourth relay 15d is performed by the ECU 30. When the relays are turned ON, the relays are closed to enable energization. When the relays are turned OFF, the relays are opened so that the power cannot be turned on. Thus, the ECU 30 is capable of selective switching of the four operation modes of the parallel operation mode and the series operation mode and the first one-side operation mode and the second one-side operation mode. In the parallel operation mode, the first EHC 21 and the second EHC 22 are connected in parallel to operate the first relay 15a, the second relay 15b, the third relay 15c, and the fourth relay 15d, so that power can be supplied to the first EHC 21 and the second EHC 22. In series operation, the second EHC 21 and the second EHC 22 are connected in series to operate the first relay 15a, the second relay 15b, the third relay 15c, and the fourth relay 15d so that the power can be supplied to the first EHC 21 and the second EHC 22. In the first one-side operation mode, so as to be capable of supplying power only to the first EHC 21, operates the first relay 15a and the second relay 15b and the third relay 15c and the fourth relay 15d. In the second one-side operation mode, so as to be capable of supplying power only to the second EHC 22, operates the first relay 15a and the second relay 15b and the third relay 15c and the fourth relay 15d.

Figure 2:
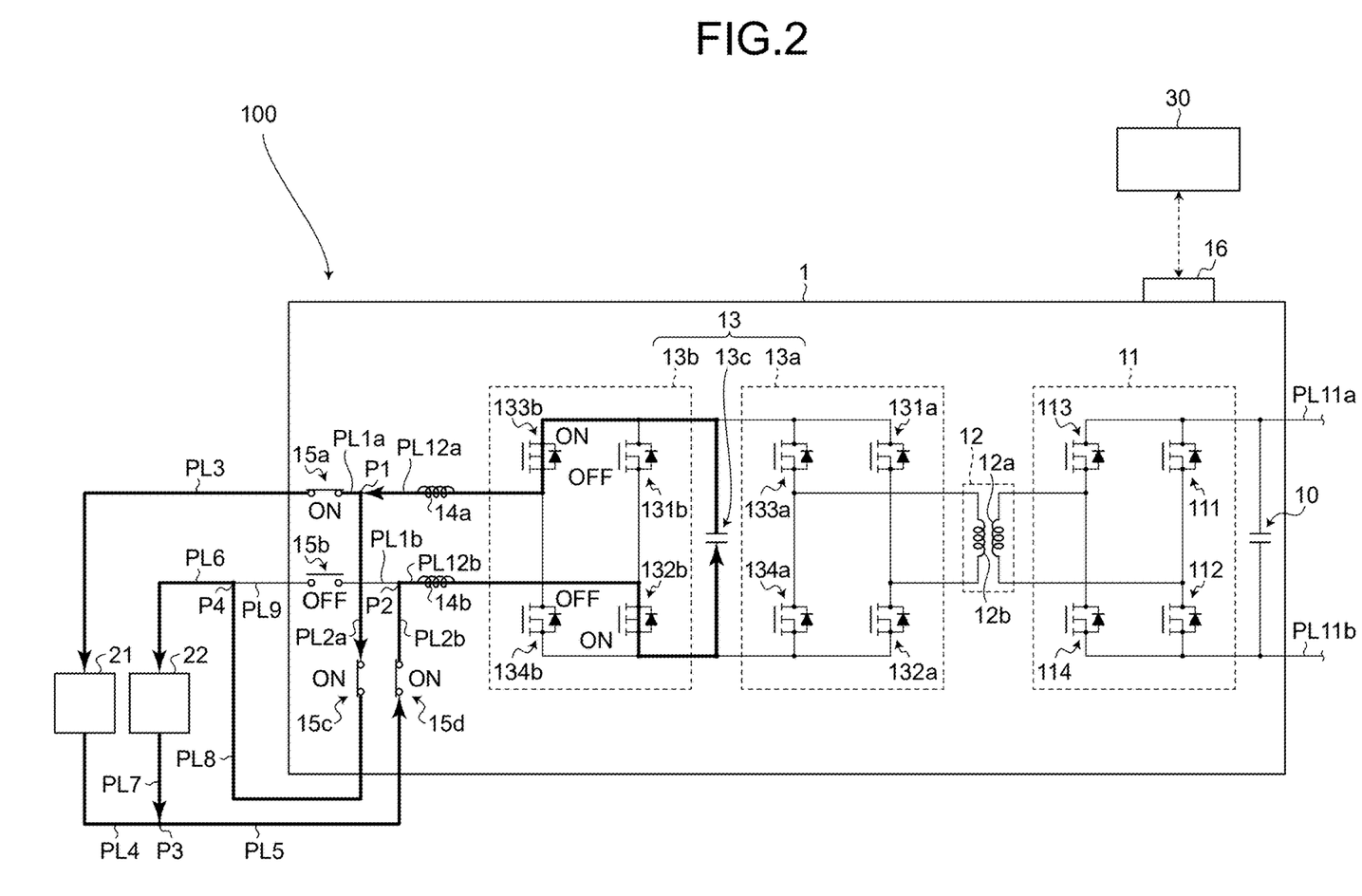
FIG. 2 is a diagram illustrating an example of a circuit configuration of a bidirectional power converter in a parallel operation mode.

FIG. 2 is a diagram illustrating an example of a circuit configuration of a bidirectional power converter in a parallel operation mode.

As illustrated in FIG. 2, in the parallel operation mode, the first relay 15a, the third relay 15c, and the fourth relay 15d are turned ON, the second relay 15b is turned OFF, and the first EHC 21 and the second EHC 22 are connected in parallel to supply power to the first EHC 21 and the second EHC 22. Further, in the parallel operation mode, the second inverter 13b of the inverter 13, the second switching element 132b and the third switching element 133b to ON, the first switching element 131b and the fourth switching element 134b to OFF.

Thick arrows in FIG. 2, as viewed from the smoothing capacitor 13c of the inverter 13 as a power supply, illustrates the flow of current returning from the high voltage side of the smoothing capacitor 13c to the low-voltage side of the smoothing capacitor 13c through the first EHC 21 and the second EHC 22.

As illustrated in FIG. 2, in the parallel operation mode, the current flowing from the smoothing capacitor 13c to the power line PL12a through the third switching element 133b and the reactor 14a, the power line PL1a at the first branch point P1 and the power line PL2a branch.

The current branched to the power line PL1a at the first branch point P1 is supplied to the first EHC 21 via the first relay 15a and the power line PL3. Then, the current flowing from the first EHC 21 to the power line PL2b through the power line PL4 and the power line PL5 and the fourth relay 15d flows to the power line PL12b at the second branch point P2. The current flowing to the power line PL12b at the second branch point P2 returns to the smoothing capacitor 13c via the reactor 14b and the second switching device 132b.

On the other hand, the current branched to the power line PL2a side at the first branch point P1 flows to the power line PL6 side at the fourth branch point P4 via the third relay 15c and the power line PL8. The current flowing to the power line PL6 at the fourth branch point P4 is supplied to the second EHC 22. Then, it flows from the second EHC 22 through the power line PL7 to the power line PL5 at the third branch point P3. The current flowing to the power line PL2b through the fourth relay 15d flows to the power line PL5 at the third branch point P3 flows to the power line PL12b at the second branch point P2. The current flowing to the power line PL12b at the second branch point P2 returns to the smoothing capacitor 13c via the reactor 14b and the second switching device 132b.

Figure 3:
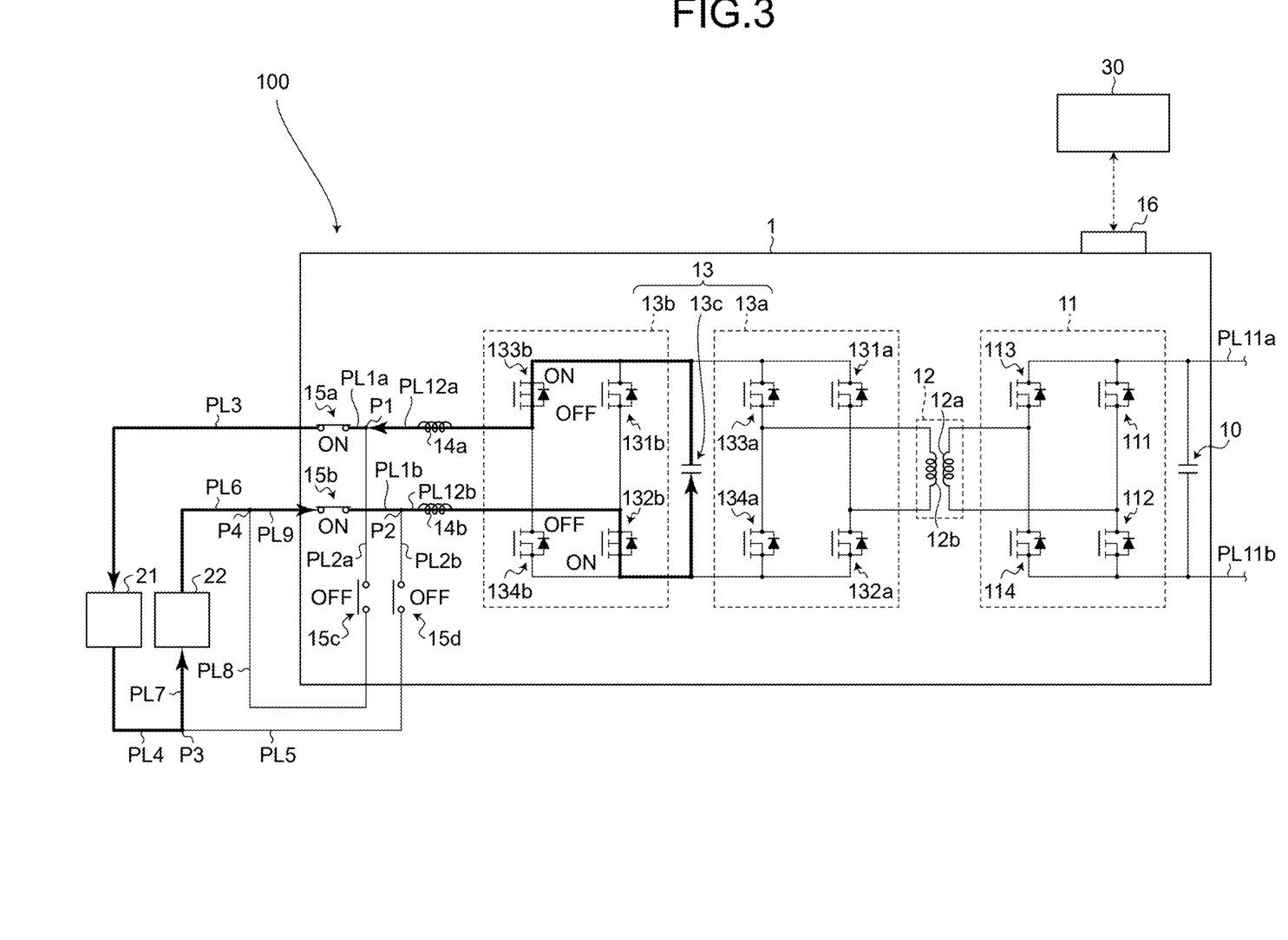
FIG. 3 is a diagram illustrating an example of a circuit configuration of a bidirectional power converter in a series operation mode.

FIG. 3 is a diagram showing an example of a circuit configuration of a bidirectional power converter 1 in a series operation mode.

As illustrated in FIG. 3, in the series operation mode, the first relay 15a and the second relay 15b are turned ON, the third relay 15c and the fourth relay 15d are turned OFF, and the first EHC 21 and the second EHC 22 are connected in series to provide power to the first EHC 21 and the second EHC 22. Also in the series operation mode, the second inverter 13b of the inverter 13, the second switching element 132b and the third switching element 133b to ON, the first switching element 131b and the fourth switching element 134b to OFF.

The thick arrows in FIG. 3, as viewed from the smoothing capacitor 13c of the inverter 13 as a power supply, indicates the flow of current returning to the low-voltage side of the smoothing capacitor 13c through the first EHC 21 and the second EHC 22 from the high-voltage side of the smoothing capacitor 13c.

As illustrated in FIG. 3, in the series operation mode, the current flowing from the smoothing capacitor 13c to the power line PL12a through the third switching element 133b and the reactor 14a, the power line PL1a at the first branch point P1 It flows to.

The current flowing to the power line PL1a at the first branch point P1 is supplied to the first EHC 21 via the first relay 15a and the power line PL3. Then, the current flowing from the first EHC 21 through the power line PL4 to the power line PL7 in the third branch point P3 is supplied to the second EHC 22. Then, the current flowing from the second EHC 22 to the power line PL6 flows to the power line PL9 at the fourth branch point P4. The current flowing to the power line PL9 side at the fourth branch point P4 flows to the power line PL12b side at the second branch point P2 via the second relay 15b and the power line PL1b. The current flowing to the power line PL12b at the second branch point P2 returns to the smoothing capacitor 13c via the reactor 14b and the second switching device 132b.

Figure 4:
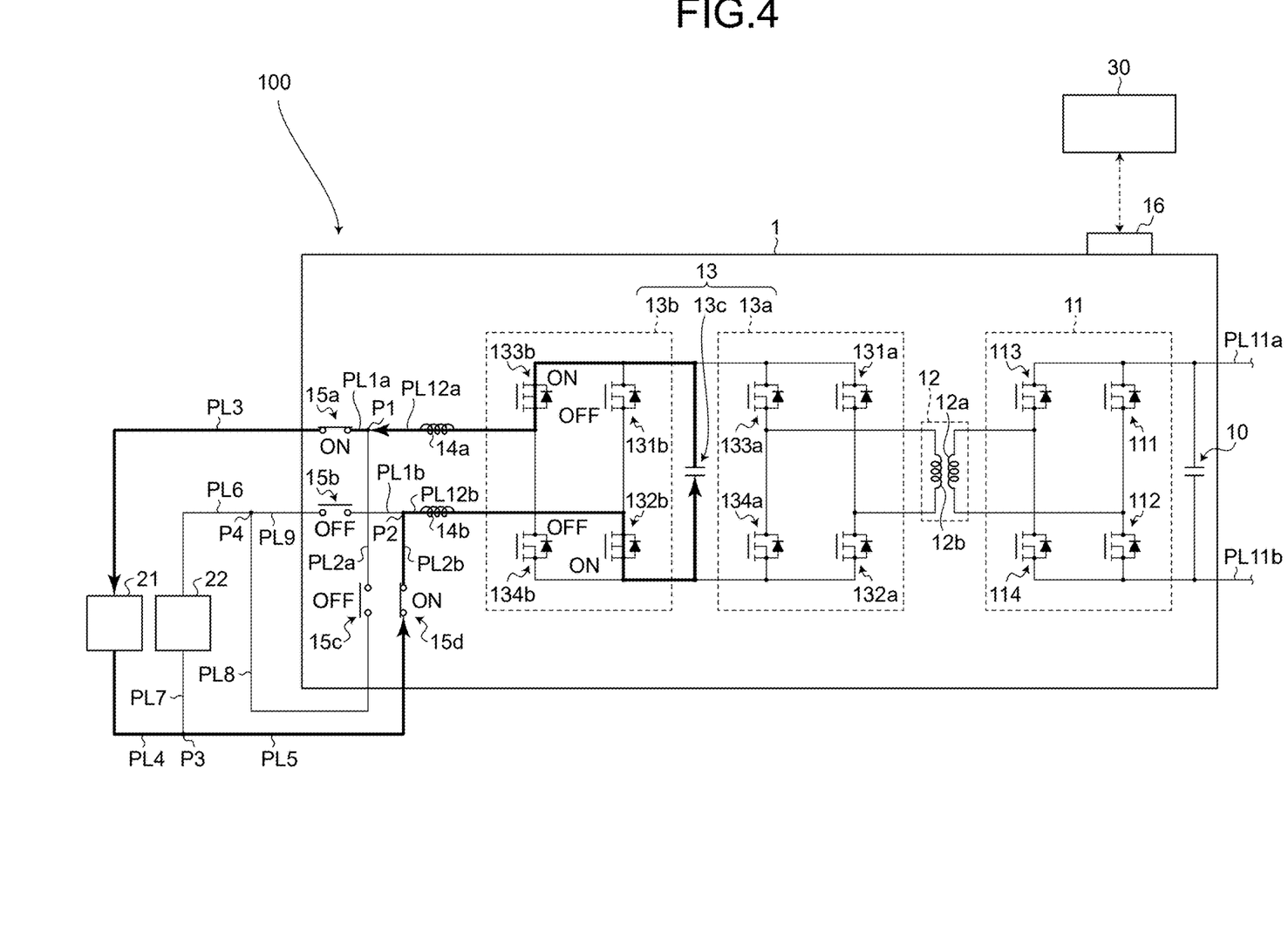
FIG. 4 is a diagram illustrating an example of a circuit configuration of a bidirectional power converter in the first one-side operation mode.

FIG. 4 is a diagram illustrating an example of the circuit configuration of the bidirectional power converter 1 in the first one-side operation mode.

As illustrated in FIG. 4, in the first one-side operation mode, the first relay 15a and the fourth relay 15d are turned ON, the second relay 15b and the third relay 15c are turned OFF, and only the first EHC 21 is operated by supplying power to the first EHC 21. Also in the first one-side operation mode, the second inverter 13b of the inverter 13, the second switching element 132b and the third switching element 133b to ON, the first switching element 131b and the fourth switching element 134b to OFF.

The thick arrows in FIG. 4, as viewed from the smoothing capacitor 13c of the inverter 13 as a power supply, indicates the flow of current returning to the low-voltage side of the smoothing capacitor 13c through the first EHC 21 from the high-voltage side of the smoothing capacitor 13c.

As illustrated in FIG. 4, in the first one-side operation mode, the current flowing from the smoothing capacitor 13c to the power line PL12a through the third switching element 133b and the reactor 14a, the power line PL1a at the first branch point P1 it flows to.

The current flowing to the power line PL1a at the first branch point P1 is supplied to the first EHC 21 via the first relay 15a and the power line PL3. Then, the current flowing from the first EHC 21 to the power line PL2b through the power line PL4 and the power line PL5 and the fourth relay 15d flows to the power line PL12b at the second branch point P2. The current flowing to the power line PL12b at the second branch point P2 returns to the smoothing capacitor 13c via the reactor 14b and the second switching device 132b.

Figure 5:
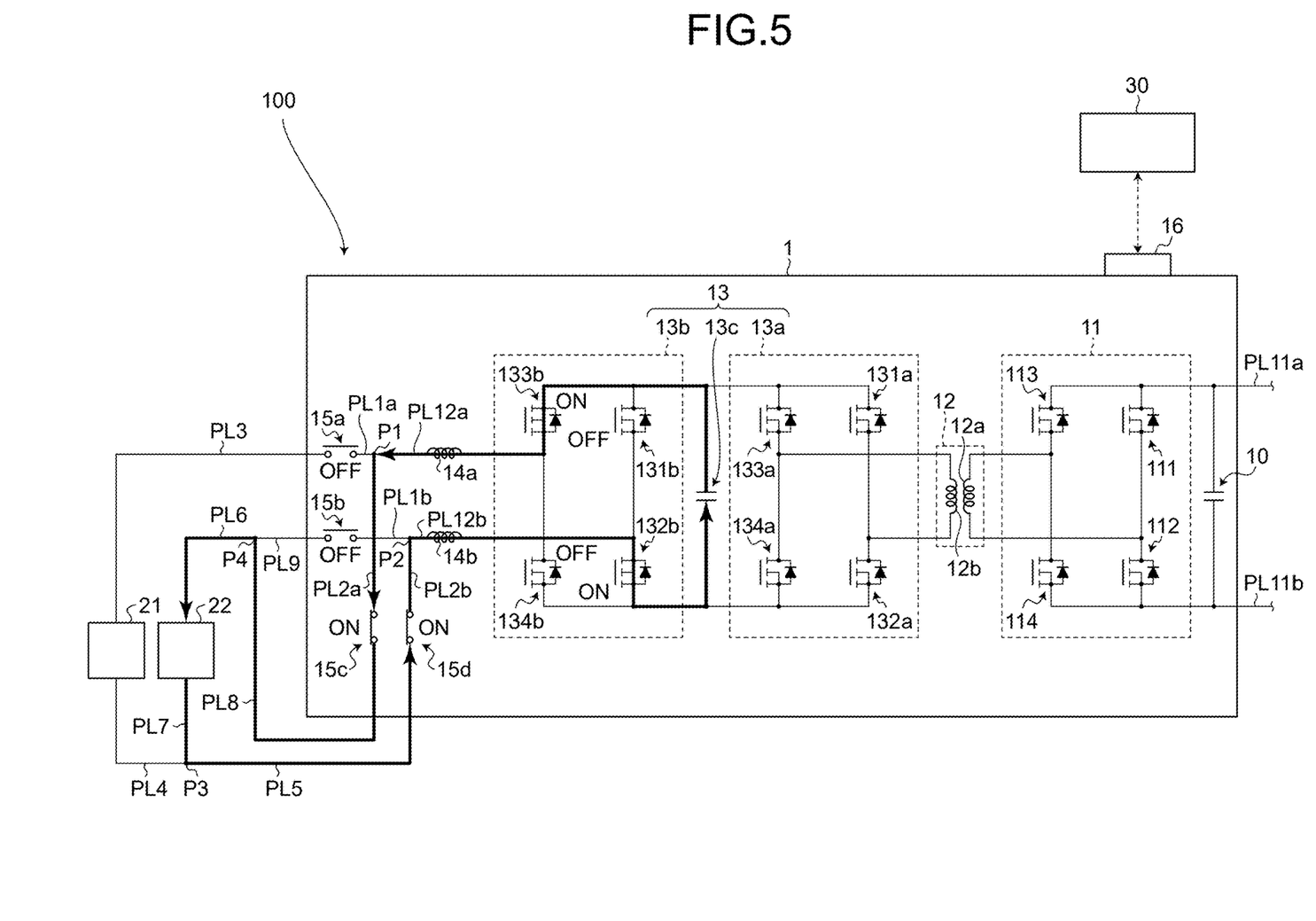
FIG. 5 is a diagram illustrating an example of a circuit configuration of a bidirectional power converter in the second one-side operation mode.

FIG. 5 is a diagram showing an example of the circuit configuration of the bidirectional power converter 1 in the second one-side operation mode.

As illustrated in FIG. 5, in the second one-side operation mode, the third relay 15c and the fourth relay 15d are turned ON, the first relay 15a and the second relay 15b are turned OFF, and only the second EHC 22 is operated by supplying power to the second EHC 22. Also in the second one-side operation mode, the second inverter 13b of the inverter 13, the second switching element 132b and the third switching element 133b to ON, the first switching element 131b and the fourth switching element 134b to OFF.

The thick arrows in FIG. 5, as viewed from the smoothing capacitor 13c of the inverter 13 as a power supply, indicates the flow of current returning to the low-voltage side of the smoothing capacitor 13c through the second EHC 22 from the high-voltage side of the smoothing capacitor 13c.

As illustrated in FIG. 5, in the second one-side operation mode, the current flowing from the smoothing capacitor 13c to the power line PL12a through the third switching element 133b and the reactor 14a flows to the power line PL2a at the first branch point P1.

The current flowing to the power line PL2a side at the first branch point P1 flows to the power line PL6 side at the fourth branch point P4 via the third relay 15c and the power line PL8. The current flowing to the power line PL6 at the fourth branch point P4 is supplied to the second EHC 22. Then, the current flowing from the second EHC 22 to the power line PL7 flows to the power line PL5 at the third branch point P3. The current flowing to the power line PL5 side at the third branch point P3 flows to the power line PL12b side at the second branch point P2 via the fourth relay 15d and the power line PL2b. The current flowing to the power line PL12b at the second branch point P2 returns to the smoothing capacitor 13c via the reactor 14b and the second switching device 132b.

Here, in the parallel operation mode, when the respective resistance values of the first EHC 21 and the second EHC 22 are scattered, for example, power supplied to the lower EHC of the resistance value will be concentrated, there is a possibility that differences occur in the warm air in the first EHC 21 and the second EHC 22. Further, in the series operation mode, since the output upper limit voltage becomes low when the input (battery side) voltage is low, cannot be sufficiently applied voltage to the first EHC 21 and the second EHC 22 connected in series, the warm-up performance there is a risk of deterioration.

Figure 6A:
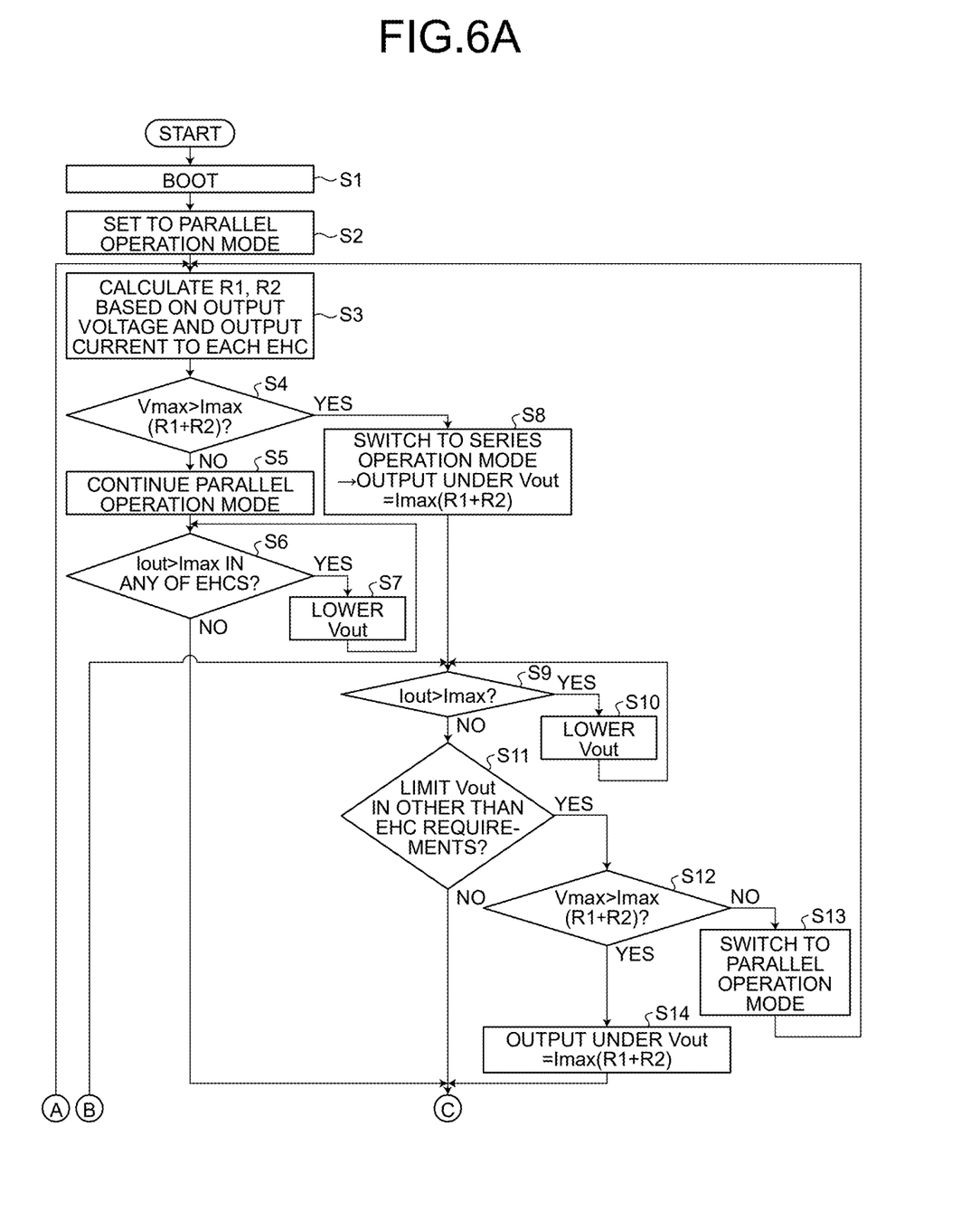
FIG. 6A is a flow chart illustrating a half part of an exemplary control implemented by an ECU in the vehicles according to the embodiment.
Figure 6B:
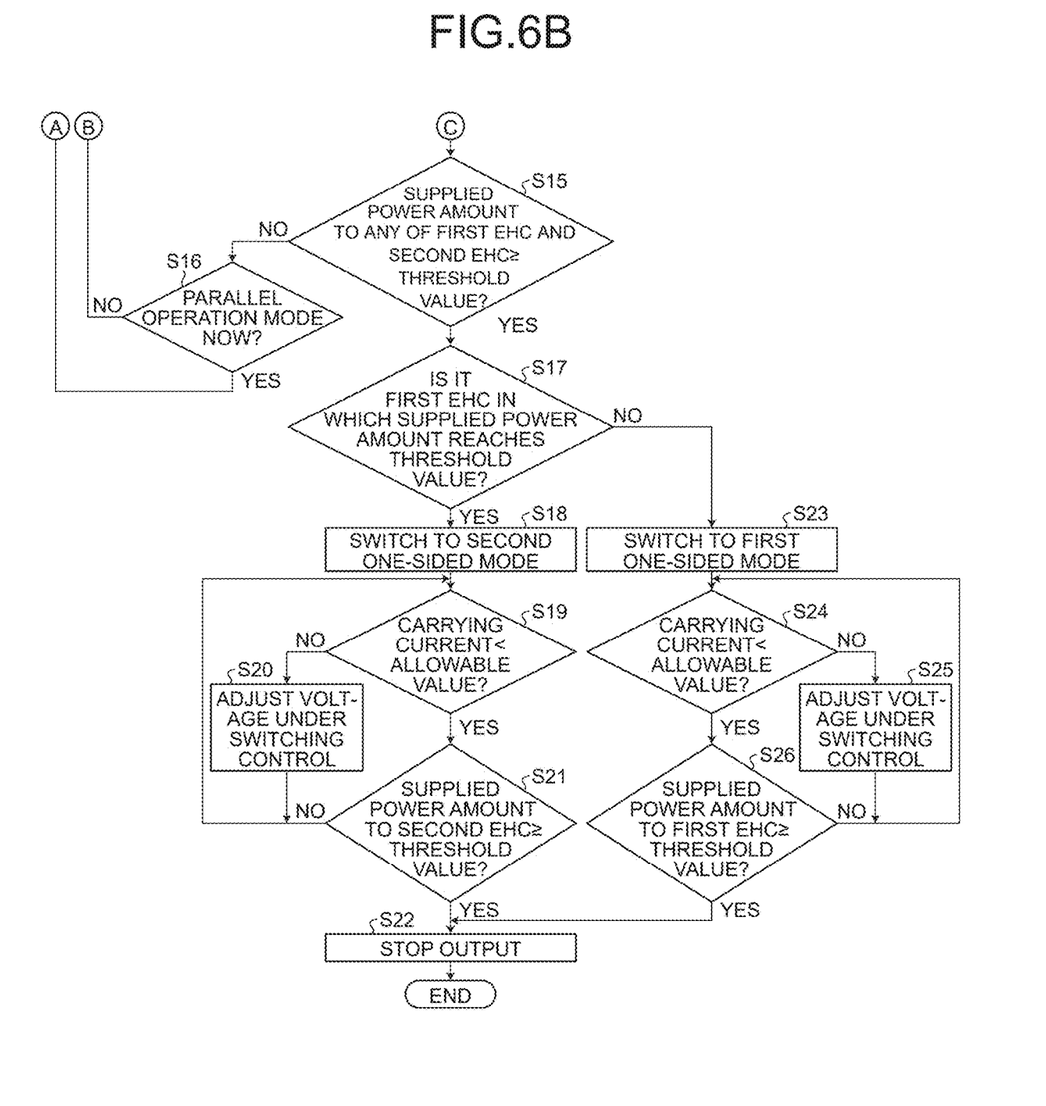
FIG. 6B is a flow chart illustrating another half part of the exemplary control implemented by the ECU in the vehicles according to the embodiment

FIGS. 6A and 6B provide a flow chart illustrating an exemplary control implemented by the ECU 30 in the vehicles according to the embodiment. Incidentally, in FIGS. 6A and 6B, Vout represents the power supply output-voltage. Further, in FIGS. 6A and 6B, Iout represents power output current, in other words, represents the supplied current of either or both of the first EHC 21 and the second EHC 22. Further, in FIGS. 6A and 6B, Imax represents the allowable current upper limit of either or both of the first EHC 21 and the second EHC 22 (EHC hardware requirements). Further, in FIGS. 6A and 6B, Vmax represents the voltage upper limit that the power supply can output (change in the input voltage, etc.).

First, The ECU 30 is activated in step S1 by the activation-switch being operated when the system is stopped. The ECU 30 is then set to parallel operation in step S2. Next, The ECU 30, in step S3, from the output voltage and the output current to the first EHC 21 and the second EHC 22, calculates a resistance-value R1, R2 of the first EHC 21 and the second EHC 22. Next, the ECU 30 determines whether or not the relationship of Vmax>Imax(R1+R2) is satisfied in step S4. That is, when it is possible to supply up to the current upper limit in the series operation mode, priority is given to the series operation mode in order to avoid power concentration. The ECU 30, in step S4, when it is determined that does not satisfy the relationship of Vmax>Imax (R1+R2) (No at step S4), the process proceeds to step S5. The ECU 30 continues to operate in parallel in step S5.

The ECU 30 then determines, in step S6, whether any of EHC satisfy Iout>Imax relationship. The ECU 30, in step S6, when it is determined that satisfies Iout>Imax relationship (Yes at step S6), the process proceeds to step S7. The ECU 30 then lowers Vout in step S7 and moves to step S6. Further, when the ECU 30, in step S6, determines that any EHC does not satisfy Iout>Imax relationship (No at step S6), the process proceeds to step S15.

Further, when the ECU 30, in step S4, determines that the relationship of Vmax>Imax(R1+R2) satisfies (Yes at step S4), the process proceeds to step S8. The ECU 30 switches to series operation in step S8. At this time, the ECU 30 is outputted by Vout=Imax(R1+R2). The ECU 30 then determines whether or not Iout>Imax relationship is satisfied in step S9. The ECU 30, in step S9, determines that Iout>Imax relationship is satisfied (Yes at step S9), the process proceeds to step S10. The ECU 30 lowers Vout at the step S10 and moves to the step S9. Further, the ECU 30, in step S9, determines that Iout>Imax relationship is not satisfied (No at step S9), the process proceeds to step S11.

In addition, the ECU 30 determines whether or not to perform Vout limit in other than EHC requirement in the step S11. In other words, when other requirements other than EHC requirements must be used to lower the voltage. If the full output cannot be achieved, the process returns to the parallel operation mode. When the ECU 30, in step S11, determines to execute EHC limit in other than Vout requirement (Yes at step S11), the process proceeds to step S12. In step S12, the ECU 30 determines whether the relationship of Vmax>Imax(R1+R2) is satisfied. The ECU 30, in step S12, determines that the relationship of Vmax>Imax(R1+R2) is not satisfied (No at step S12), the process proceeds to step S13. The ECU 30 switches to the parallel operation mode in step S13, and shifts to the step S3.

Further, the ECU 30, in step S12, determines that the relationship of Vmax>Imax(R1+R2) is satisfied (Yes at step S12), the process proceeds to step S14. In step S14, the ECU 30 outputs Vout=Iout(R1+R2), and the process proceeds to step S15.

In the step ECU 30, in step S11, when it is determined not to execute EHC limit other than Vout limit (No at step S11), the process proceeds to step S15.

The ECU 30 determines whether or not the supplied electric energy to the first EHC 21 or the second EHC 22 is equal to or more than a threshold value in step S15. That is, when the desired power supply to one of the EHCs is completed, the power supply to only the other EHC. When the ECU 30, at step S15, determines that the supplied power to the first EHC 21 or the second EHC 22 is not to be equal to or greater than the threshold value (No at step S15), the process proceeds to step S16. The ECU 30 determines whether or not it is currently in parallel operation-mode in step S16. When the ECU 30 determines, in step S16, at present, that the parallel operation mode (Yes at step S16), the process proceeds to step S3. Further, the ECU 30, in step S16, at present, determines that it is not the parallel operation mode (No at step S16), the process proceeds to step S9.

Further, the ECU 30 determines, in step S15, that the supplied power to the first EHC 21 or the second EHC 22 is equal to or greater than the threshold value (Yes at step S15), the process proceeds to step S17. When the ECU 30 determines whether the EHC in which the supplied electric energy reaches the threshold value is the first EHC 21 in step S17.

When the ECU 30 determines, in step S17, that the EHC in which the supplied power amount has reached the threshold value is the first EHC 21 (Yes at step S17), the process proceeds to step S18. The ECU 30 switches to the second one-sided mode in step S18. Next, the ECU 30 determines whether or not the energizing current is equal to or less than the allowable value in step S19. In step S19, the ECU 30 proceeds to step S20 and determines that the energization current is not less than the allowable value (No at step S19). The ECU 30, in step S20, performs a voltage-adjustment in the switching control in the second inverter 13b or the like of the inverter 13, and proceeds to step S19.

Further, when the ECU 30, in step S19, determines that the energization current is equal to or less than the allowable value (Yes at step S19), the process proceeds to step S21. The ECU 30 determines whether or not the power supplied to the second EHC 22 is equal to or more than a threshold value in step S21. When the ECU 30, in step S21, determines that the supplied power to the second EHC 22 is not equal to or greater than the threshold value (No at step S21), the process proceeds to step S19. Further, when the ECU 30 determines, in step S21, that the supplied power to the second EHC 22 is equal to or greater than the threshold value (Yes at step S21), the process proceeds to step S22. The ECU 30 performs a power outage (stop output) in step S22. The ECU 30 then terminates the series of controls.

In addition, when the ECU 30, in step S17, determines that the EHC in which the supplied electric energy has reached the threshold value is not the first EHC 21 but the second EHC 22 (No at step S17), the process proceeds to step S23. The ECU 30 switches the relay to the first one-side-mode in step S23. Next, the ECU 30 determines whether or not the energizing current is equal to or less than an allowable value in step S24. In step S24, the ECU 30 proceeds to step S25 when it is determined that the energization current is not less than the allowable value (No at step S24). The ECU 30, in step S25, performs a voltage-adjustment in the switching control in the second inverter 13b or the like of the inverter 13, the process proceeds to step S24.

Further, when the ECU 30 determines, in step S24, that the energization current is equal to or less than the allowable value (Yes at step S24), the process proceeds to step S26. The ECU 30 determines whether or not the power supplied to the first EHC 21 is equal to or more than a threshold value in step S26. When the ECU 30 determines, in step S26, that the supplied power to the first EHC 21 is not equal to or greater than the thresholds (No at step S26), the process proceeds to step S24. Further, when the ECU 30 determines, in step S26, that the supplied power to the first EHC 21 is be equal to or greater than the threshold (Yes at step S26), the process proceeds to step S22. The ECU 30 performs a power outage in step S22. The ECU 30 then terminates the series of controls.

In the vehicles according to the embodiment, the power can be supplied to the EHCs of the two systems (i.e., the first EHC 21 and the second EHC 22) with one power source. Further, in the vehicle according to the embodiment, the control of ON and OFF of the relays 15a, 15b, 15c, and 15d by the ECU 30 enables the selective switching of the four operation modes of the parallel operation mode, the series operation mode, the first one-side operation mode, and the second one-side operation mode, thereby enabling efficient power to be supplied to the first EHC 21 and the second EHC 22. In addition, the control of ON and OFF of the relays 15a, 15b, 15c, and 15d can simultaneously provide power to the first EHC 21 and the second EHC 22 and power to 2AC outlet and the electrically connected in-vehicle outlet in any operation mode.

Vehicle according to the present disclosure has an effect that it is possible to supply power from the bidirectional power conversion device to the electric heating type catalyst of the two systems of the first electric heating type catalyst and the second electric heating type catalyst.

According to an embodiment, it is possible to supply power from the bidirectional power conversion apparatus to the first electric heating type catalyst and the second electric heating type catalyst two systems of the electric heating type catalyst.

According to an embodiment, it is possible to efficiently power supply to the first electric heating type catalyst and the second electric heating type catalyst.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
an internal combustion engine;
a rotating electric machine, which is a driving source for running the vehicle;
a power storage device for storing power to be supplied to the rotating electric machine;
a first electric heating type catalyst and a second electric heating type catalyst, each of which has a catalyst for purifying exhaust gas discharged from the internal combustion engine and is configured to be supplied power from the power storage device to electrically heat the catalyst; and
a bidirectional power converter having a DC port for electrically connecting to the power storage device, a first AC port to which a first AC power for charging the power storage device is input, and a second AC port for outputting a second AC power, wherein
the bidirectional power converter is configured to convert the first AC power into DC power to output the DC power to the DC port, and convert DC power supplied from the power storage device into the second AC power to output the second AC power to the second AC port, and
the vehicle further comprising:
a plurality of relays, which are electrically connected, via a plurality of power lines, to a first power path, which connects the bidirectional power converter and the first AC port, and a second power path connecting the bidirectional power converter and the second AC port, configured to at least select one of and switch between parallel connection and series connection of the first electric heating type catalyst and the second electric heating type catalyst; and
a controller configured to control ON and OFF of each of the relays.

2. The vehicle according to claim 1, wherein
the controller is configured to control ON and OFF of each of the relays to selectably switch among a parallel operation mode, a series operation mode, a first one-side operation mode, and a second one-side operation mode, wherein in the parallel operation mode, the first electric heating type catalyst and the second electric heating type catalyst are connected in parallel and power is supplied to both the first electric heating type catalyst and the second electric heating type catalyst;
in the series operation mode, the first electric heating type catalyst and the second electric heating type catalyst are connected in series and power is supplied to both the first electric heating type catalyst and the second electric heating type catalyst;
in the first one-side operation mode, power is supplied only to the first electric heating type catalyst; and
in the second one-side operation mode, power is supplied only to the second electric heating type catalyst.

3. The vehicle according to claim 1, wherein the rotating electric machine is a motor generator and the power storage device is a battery.

4. The vehicle according to claim 2, wherein the rotating electric machine is a motor generator and the power storage device is a battery.

* * * * *